United States Patent
Yorimoto et al.

(10) Patent No.: US 7,391,902 B2
(45) Date of Patent: Jun. 24, 2008

(54) IMAGE READING APPARATUS

(75) Inventors: Kouji Yorimoto, Iwatsuki (JP); Hidetaka Hama, Iwatsuki (JP); Kazuhito Minowa, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 865 days.

(21) Appl. No.: 10/938,583

(22) Filed: Sep. 13, 2004

(65) Prior Publication Data

US 2005/0200865 A1   Sep. 15, 2005

(30) Foreign Application Priority Data

Mar. 11, 2004   (JP)   ............................. 2004-068539

(51) Int. Cl.
 *G06K 9/00*   (2006.01)
(52) U.S. Cl. ........................................ 382/167; 382/274
(58) Field of Classification Search ................. 382/162, 382/167, 180, 274; 358/3.01, 3.07, 536
 See application file for complete search history.

(56) References Cited

U.S. PATENT DOCUMENTS

| 5,729,637 | A | * | 3/1998 | Nicholson et al. | ............ 382/282 |
| 5,999,664 | A | * | 12/1999 | Mahoney et al. | ............ 382/305 |
| 6,512,899 | B2 | * | 1/2003 | Shimada et al. | ............... 399/82 |

FOREIGN PATENT DOCUMENTS

| JP | A 11-098353 | 4/1999 |
| JP | A 2002-314736 | 10/2002 |

* cited by examiner

*Primary Examiner*—Phuoc Tran
(74) *Attorney, Agent, or Firm*—Oliff & Berridge, PLC (57) ABSTRACT

An image reading apparatus is composed of an image input unit for obtaining multi-valued image data by reading an image optically; an image processing unit for performing image processing including screen processing on the multi-valued image data obtained by the image input unit; a data converting unit for converting image data obtained by the image processing of the image processing unit into a form that is described in a page description language; and an image output unit for outputting image data obtained by the conversion of the data converting unit to the outside.

11 Claims, 5 Drawing Sheets

IMAGE READING APPARATUS

BACKGROUND OF THE INVENTION

1. Field of the Invention

The present invention relates to an image reading apparatus for optically reading an image on an original document.

2. Background Art

With the recent development of the computer technologies, the network technologies, etc., image processing systems are now used widely that are equipped with an image reading apparatus such as a scanner, a host computer (hereinafter referred to simply as "host PC") such as a personal computer, and an image output apparatus such as a printer. Such image processing systems are usually configured in such a manner that when the image reading apparatus has read a color image on an original document as RGB multi-valued data, the RGB multi-valued data are transferred to and stored in the host PC and then the image output apparatus receives the RGB multi-valued data and prints those data by performing color conversion processing into the YMCK color space, screen processing, etc. Among such image processing systems are ones capable of printing RGB multi-valued image data without depending on the kind of image processing function of the image output apparatus because the host PC performs image processing that should inherently be performed by the image output apparatus (e.g., JP-A-11-98353). There also exist image processing systems in which RGB multi-valued image data obtained by the image reading apparatus can be output by the image output apparatus without intervention of the host PC (e.g., JP-A-2002-314736).

Incidentally, in each of the above conventional configurations, the image processing necessary for printing RGB multi-valued image data such as color conversion processing, gradation correction processing, and screen processing depends on the image processing function of the image output apparatus or the image processing function the host PC takes over. Further, RGB multi-valued data that are read by the image reading apparatus are not necessarily intended for printing. Therefore, depending on the kind of image processing function of the image output apparatus (i.e., the type of image output apparatus) or the kind of image processing function the host PC takes over (i.e., the kind of software that runs on the host PC), scanned-in RGB multi-valued image data may be printed without being subjected to proper image processing. This may cause image quality problems; for example, characters are blurred and the background is fogged in the case of a text original document or the like and moiré occurs in the case of a photograph original document consisting of halftone dots or the like. Further, since RGB multi-valued image data are sent to the host PC or the image output apparatus, the transfer load and the image processing load in each apparatus are increased, which results in a problem of reduction in productivity.

SUMMARY OF THE INVENTION

The present invention, made for resolving the aforementioned technical drawbacks, is to provide an image reading apparatus that enables high-quality printing without depending on external functions of an image output apparatus or a host PC intervening between the image reading apparatus and an image output apparatus and that can realize high-productivity printing by sending data directly to an image output apparatus without intervention of a host PC.

An image reading apparatus according to the invention that has been devised to attain the above object is characterized by including a image input unit for obtaining multi-valued image data by optically reading an image on an original document; an image processing unit for performing image processing including screen processing on the multi-valued image data obtained by the image input unit; a data converting unit for converting image data obtained by the image processing of the image processing unit into a form that is described in a page description language; and an image output unit for outputting image data obtained by the conversion of the data converting unit to the outside.

In the image reading apparatus having the above configuration, the image processing unit performs the screen processing including the screen processing. The term "screen processing" means image processing that enables pseudo-reproduction of half tone like the binary screen processing, for example, does. The screen processing converts (gradation-corrects) multi-valued image data read optically by the image input unit into image data that are suitable for printing. In addition, the image-processed image data are converted by the data converting unit into a form that is described in the page description language. The "page description language" is a programming language for image drawing that can be interpreted by general image output apparatus. Therefore, in processing image data to the outside, the image output unit can send the image data directly to an image output apparatus without intervention of a host PC. Even in this case, high-quality printouts can be obtained without depending on the image processing functions of the image output apparatus. Further, since the amount of data is reduced by the screen processing, the image data output load of the image output unit can be reduced.

Another image reading apparatus according to the invention that has been devised to attain the above object is characterized by including an image input unit for obtaining multi-valued image data by optically reading an image on an original document; an image processing unit for performing image processing including screen processing on the multi-valued image data obtained by the image input unit; and an image output unit for outputting image data obtained by the image conversion of the image processing unit to the outside, and the image reading apparatus is further characterized in that the image processing unit performs the image processing on the basis of output characteristics data of an image output apparatus that is to print the image data that are output by the image output unit.

In the image reading apparatus having the above configuration, the image processing unit performs the image processing including the screen processing (e.g., binary screen processing). Therefore, even if the image input unit obtains multi-valued image data by optical reading, the multi-valued image data are converted (gradation-corrected) into image data that are suitable for printing. In addition, the image processing is performed on the basis of the output characteristics data of an image output apparatus that is to print the image data. The term "output characteristics data" means image processing methods and parameters that relate to printing characteristics of the image output apparatus and that are referred to in, for example, gradation correction processing, color conversion processing, black generation processing, screen processing, or other processing. Therefore, the image processing performed by the image processing unit is made suitable for the output characteristics of the image output apparatus that is to print the image data. That is, even if the image output unit sends the image data directly to the image output apparatus without intervention of a host PC in outputting the image data to the outside, high-quality printouts can be obtained without depending on the image processing functions of the image output apparatus because the image data have been subjected to the image processing suitable for the output characteristics of the image output apparatus. Further, since the amount of data is reduced by the screen processing, the image data output load of the image output apparatus can be reduced.

In the image reading apparatus according to the invention, the image processing unit performs the image processing including the screen on multi-valued image data. Therefore, image data that are suitable for printing can be output to the outside, and hence high-quality printouts can be obtained without depending on the image processing functions of an image output apparatus. Further, since the amount of data is reduced by the screen processing, the image data output load of the image output unit can be reduced. Therefore, high-productivity printing can be realized by sending image data directly to an image output apparatus while high-quality printing is enabled without depending on external functions.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

An image reading apparatus according to the present invention will be hereinafter described with reference to the drawings.

Embodiment 1

Figure 1:
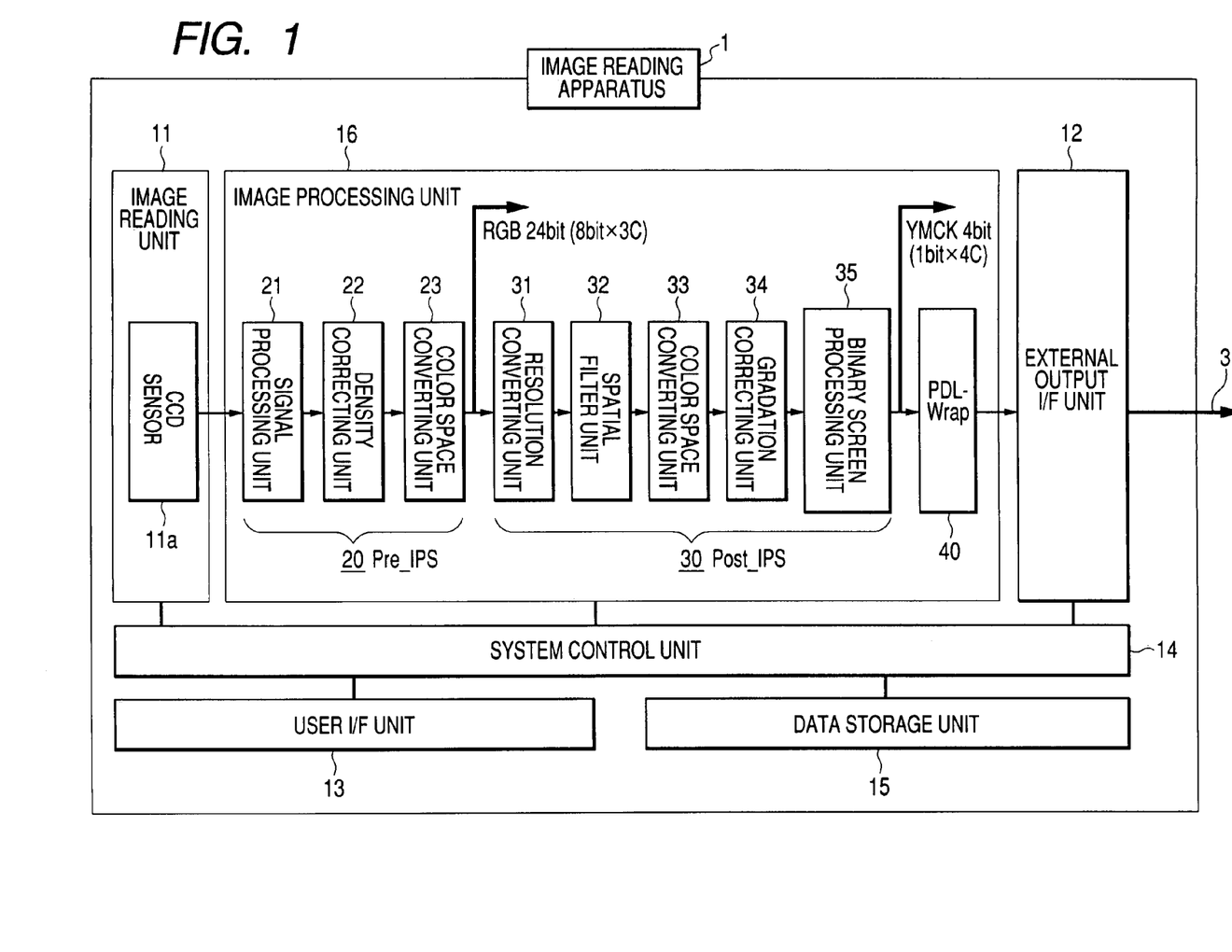
FIG. 1 is a block diagram showing a general configuration of an image reading apparatus according to the present invention.
Figure 2A:
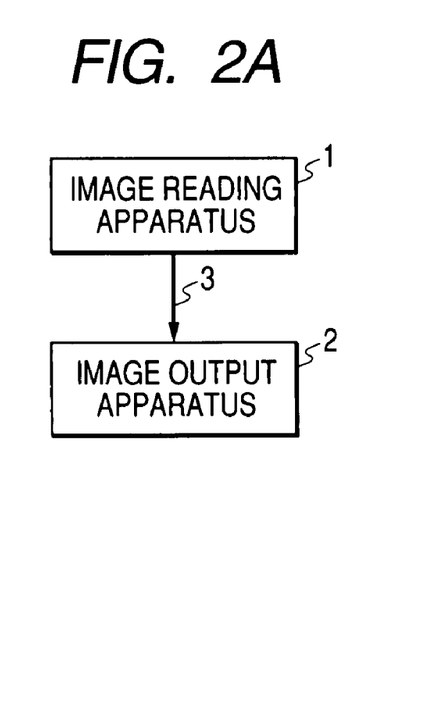
FIGS. 2A and 2B are block diagrams showing system configurations according to a first embodiment of the invention.
Figure 2B:
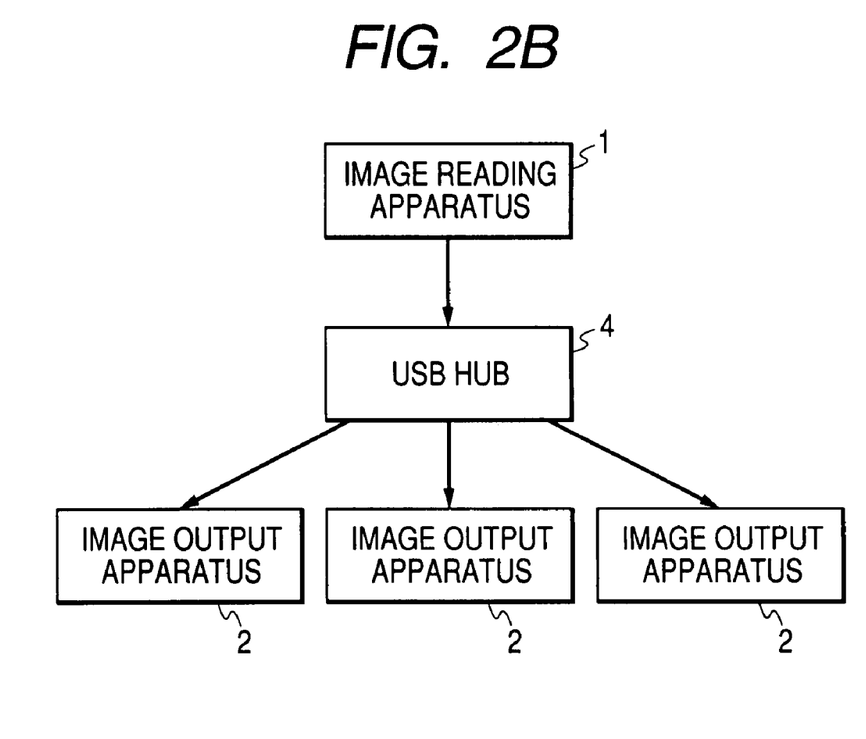

First, a first embodiment of the invention will be described. FIG. 1 is a block diagram showing a general configuration of the image reading apparatus according to the invention. FIGS. 2A and 2B are block diagrams showing system configurations according to a first embodiment of the invention.

First, the system configuration using the image reading apparatus will be described. As shown in FIG. 2A, the system being described is equipped with the image reading apparatus 1, an image output apparatus 2, and a communication channel 3 that connects the image reading apparatus 1 and the image output apparatus 2.

The image reading apparatus 1, which is a scanner, for example, optically reads an image on an original document as a subject of reading. The image reading apparatus 1 is not limited to a scanner, and may be a copier having a scanner function or what is called a multifunction machine having a copier function, a printer function, and a facsimile function as long as it reads an image optically.

The image output apparatus 2, which is a printer utilizing the known electrophotographic technology, for example, prints image data on a recording sheet as a visible image. It is assumed that the image output apparatus 2 has a function of interpreting a page description language (hereinafter referred to simply as "PDL") that is a programming language for image drawing that can be interpreted by general printers.

The communication channel 3 is to enable wired or wireless communication between the image reading apparatus 1 and the image output apparatus 2. A specific example is one that complies with USB (universal serial bus) 2.0.

FIG. 2A shows the example in which the single image output apparatus 2 is connected to the image reading apparatus 1. However, a plurality of image output apparatus 2 may be connected to the image reading apparatus 1 via a USB 2.0-compatible hub 4 as shown in FIG. 2B as long as communication channels 3 comply with USB 2.0.

Next, the image reading apparatus 1 that is used in the above-configured systems will be described in more detail. As shown in FIG. 1, the image reading apparatus 1 is generally composed of an image reading unit 11, an external output interface unit 12, a user interface unit 13, a system control unit 14, a data storage unit 15, and an image processing unit 16.

Equipped with a CCD (charge coupled device) sensor 11a, the image reading apparatus 11 is to optically read a color image on an original document as a reading subject with the CCD sensor 11a and to obtain color image data through a photoelectric conversion. The CCD sensor 11a acquires RGB multi-valued image data as color image data.

The external output interface unit 12 is to send image data to the image output apparatus 2 via the communication channel 3. For example, if the communication channel 3 complies with USB 2.0, the external output interface unit 12 is to realize a function of what is called a USB 2.0 host.

The user interface unit 13, which is a control panel, for example, is to be manipulated by a user of the image reading apparatus 1.

The system control unit 14 is to control the entire operation of the image reading apparatus 1. As described later in detail, manipulation controls performed by the system control unit 14 include a printer-job-language (hereinafter referred to as "PJL")-based negotiation, for example. Naturally, a negotiation with the image output apparatus 2 need not always be realized as a PJL-based one and may be realized by other bidirectional information transmitting unit.

The data storage unit 15 is to store various kinds of information. As described later in detail, information to be stored in the data storage unit 15 include parameter data on the basis of which the image processing unit 16 performs image processing.

The image processing unit 16 is to perform image processing on RGB multi-valued image data obtained by the image reading apparatus 1. To this end, the image processing unit 16 is composed of a first image processing unit (hereinafter referred to as "Pre-IPS (image processing system)") 20, a second image processing unit (hereinafter referred to as "Post IPS") 30, and a third image processing unit (hereinafter referred to as "PDL-Wrap") 40.

The Pre-IPS 20 is a module for correcting characteristics depending on the image reading apparatus, and is composed of a signal processing unit 21 for performing an AD conversion, a shading correction, and a gap correction, a density correcting unit 22 for performing a density correction, and a color space converting unit 23 for performing a color space conversion from RGB to Lab. The details of the processing performed by each of the units 21-23 will not be described because they are known.

The Post-IPS 30 is composed of a resolution converting unit 31 for performing a resolution conversion including enlargement/reduction, a spatial filter unit 32 for correcting a frequency characteristic, a color space converting unit 33 for performing a color space conversion from Lab to RGB, a gradation correcting unit 34 for performing under color removal, a gradation correction, etc., and a binary screen processing unit 35 for performing binary screen processing. That is, the Post-IPS 30 performs, on multi-valued image data, image processing suitable for printing such as the color conversion into YMCK (or YMC), the gradation correction, and the binary screen processing.

Among the above kinds of processing, the binary screen processing performed by the binary screen processing unit 35 is, for example, pseudo-gradation display processing of a dither method, a density pattern method, or an error diffusion method. That is, the term "binary screen processing" as used here is binarization processing that enables pseudo-reproduction of halftone through block-by-block binarization, each block having a prescribed size.

The PDL-Wrap 40 is to convert image data that have been processed by the Post-IPS into PDL format data. The PDL is a programming language for image drawing that can be interpreted by general image output apparatus, a typical example of which is PostScript (registered trademark) of Adobe Systems, Inc. (in the US).

The details of the processing performed by each of the units 31-35 of the Post-IPS 30 and the PDL-Wrap 40 will not be described because they are known like the Pre-IPS 20. The Pre-IPS 20, the Post-IPS 30, and the PDL-Wrap 40 can be implemented as hardware by combining dedicated ASICs (application-specific integrated circuits).

Figure 3:
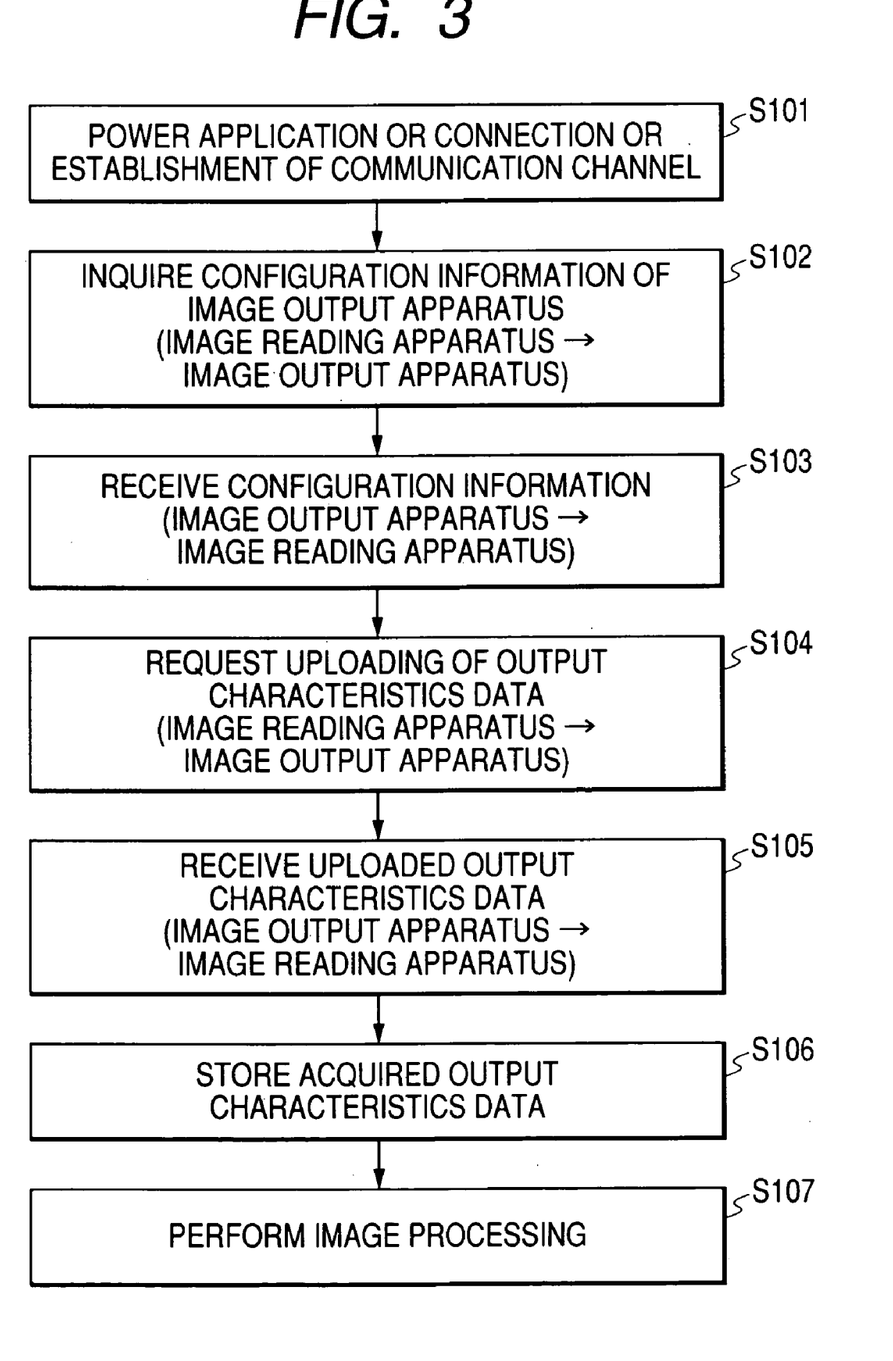
FIG. 3 is a flowchart showing an exemplary operation of the image reading apparatus according to the invention.

Next, an exemplary operation that is performed by the above-configured image reading apparatus 1 when it is used in the above-described systems will be described. FIG. 3 is a flowchart showing an exemplary operation of the image reading apparatus 1 according to the invention.

Before printing of read-out color image data in the image output apparatus 2, the image reading apparatus 1 performs a negotiation for collecting various kinds of information on the image output apparatus 2. More specifically, in the image reading apparatus 1, at a time point when a power application instruction comes from the user interface unit 13 or the communication channel 3 is connected to the external output interface unit 12 or is established after power application (step 101; "step" will be hereinafter abbreviated as "S"), the system control unit 14 inquires of the image output apparatus 2 about its configuration information (S102). The inquiry can be made in the form of a PJL-based negotiation via the communication channel 3. The configuration information to inquire about is information relating to the functional configuration of the image output apparatus 2, specifically, a type name, color/black-and-white discrimination, a compatible PDL name, etc.

When configuration information comes from the image output apparatus 2 via the communication channel 3 in response to the inquiry (S103), in the image reading apparatus 1 the system control unit 14 requests the image output apparatus 2 to upload output characteristics data of the image output apparatus 2 (S104). This requires can also be made in the form of a PJL-based negotiation via the communication channel 3. The "output characteristics data" are image processing methods and parameters that relate to printing characteristics of the image output apparatus 2 and that are referred to gradation correction processing, color conversion processing, black generation processing, screen processing, or other processing. For example, the output characteristics data are output gradation correction data that is a gradation characteristic analysis result of the image output apparatus 2, data relating to color conversion characteristics (e.g., an output color range) of the image output apparatus 2, and other data. That is, the output characteristics data are data corresponding to image quality parameters that depend on the image output apparatus 2. The request of output characteristics data is made on the basis of the already acquired configuration information of the image output apparatus 2. For example, the image reading apparatus 1 requests output characteristics data for printing of a color image if it recognizes from the configuration information that the image output apparatus 2 is a color machine. And the image reading apparatus 1 requests output characteristics data for printing of a black-and-white image if it recognizes from the configuration information that the image output apparatus 2 is a black-and-white machine.

When output characteristics data are uploaded by the image output apparatus 2 via the communication channel 3, in the image reading apparatus 1 the external output interface unit 12 receives the output characteristics data (S105) and the system control unit 14 stores the output characteristics data in a prescribed area of the data storage unit 15 (S106). Where a plurality of image output apparatus 2 are connected as shown in FIG. 2B, the system may operate in such a manner that output characteristics data are uploaded by each image output apparatus 2 and stored in the data storage unit 15 so as to be correlated with an identifier (e.g., address information) of each image output apparatus 2.

Then, when the image reading apparatus 1 receives an image reading and print instruction through the user interface unit 13, the image reading unit 11 reads a color image on an original document as a reading subject with the CCD sensor 11a and thereby obtains RGB multi-valued image data. The image processing unit 16 performs image processing on the RGB multi-valued image data (S107).

More specifically, the Pre-IPS 20 performs an AD conversion, a shading correction, a gap correction, a density correction, an RGB-to-Lab color space conversion, etc. on RGB multi-valued image data of 24 bits (8 bits×3 colors), for example. Then, the Post-IPS 30 performs a resolution conversion, a frequency characteristic correction, an Lab-to-YMCK (or YMC) color space conversion, under color removal, a gradation correction, binary screen processing, etc. As a result, the RGB multi-valued image data are converted into YMCK binary image data of 4 bits (1 bit×4 colors).

Although in this embodiment conversion is made into the YMCK (or YMC) color space, what is essential is that conversion is made into the colors (primary colors) of colorants themselves used in each image output apparatus 2.

At this time, the output characteristics data of the image output apparatus 2 designated by the print instruction are stored in the data storage unit 15. Therefore, the image processing unit 16, in particular, the Post-IPS 30, performs the image processing on the basis of the output characteristics data stored in the data storage unit 15. Specifically, it is made possible to perform the Lab-to-YMCK (or YMC) color space conversion on the basis of the data relating to the color conversion characteristic stored in the data storage unit 15 or to perform the binary screen processing on the basis of the output gradation correction data stored in the data storage unit 15.

At this time, the Post-IPS 30 may select the image processing to be performed on the multi-valued image data in accordance with the output characteristics data stored in the data storage unit 15. For example, in performing the binary screen processing, the binary screen processing unit 35 of the Post-IPS 30 may select among a dither method, a density pattern method, an error diffusion method, etc. as appropriate in accordance with the output characteristics data stored in the data storage unit 15.

Further, the PDL-Wrap 40 performs conversion into PDL-format image data on the YMCK binary image data. At this time, also in the PDL-Wrap 40, the kind of PDL format may be selected in accordance with configuration information such as a PDL name that was acquired from the image output apparatus 2.

After completion of the image processing by the image processing unit 16, in the image reading apparatus 1 the external output interface unit 12 sends the image-processed YMCK binary image data via the communication channel 3 to the image output apparatus 2 that was designated by the print instruction. As a result, the image data that have been read and image-processed by the image reading apparatus 1 are sent to the image output apparatus 2 and printed as a visible image on a recording sheet by the image output apparatus 2.

As described above, in the image reading apparatus 1 according to the embodiment, the Post-IPS 30 is equipped with the gradation correcting unit 34 and the binary screen processing unit 35 in addition to the resolution converting unit 31, the spatial filter unit 32, and the color space converting unit 33. Therefore, even where read-out image data are to be printed by the image output apparatus 2, the image data are subjected to binary screen processing in which the fact that the image data will be printed is taken into consideration, whereby high-quality printouts can be obtained even though no particular image processing is performed in the image output apparatus 2. That is, since image processing suitable for printing that includes the binary screen processing (and the spatial filtering, under color removal, and gradation correction) is performed in the image reading apparatus 1, high-quality printouts can be obtained without depending on the image processing functions of the image output apparatus 2.

In addition, since the amount of data can be reduced by the binary screen processing in the image reading apparatus 1, it is expected that the image data output load is reduced. This is particularly effective when the image reading apparatus 1 reads at a high resolution to realize high-quality printing. The reduction in the amount of image data by the binary screen processing leads to great reduction in the processing time of the image output apparatus 2. Therefore, in a system that is equipped with the image reading apparatus 1, the printout productivity can be made higher than in conventional systems by virtue of the use of the image reading apparatus 1.

In the image reading apparatus 1 according to this embodiment, image data are converted into a PDL-format image data and the PDL-format image data are sent out from the external output interface unit 12. Therefore, even if such image data are sent directly to the image output apparatus 2, the image output apparatus 2 can interpret the image data. That is, a direct system can be constructed in which the image reading apparatus 1 and the image output apparatus 2 are connected to each other without intervention of a host PC or the like. Even in such a case, high-quality printouts can be obtained without depending on the image processing functions of the image output apparatus 2.

In particular, as described in the embodiment, since in performing the image processing in the image reading apparatus 1 the binary screen processing is performed after conversion into YMCK or YMC color space image data, the image data as subjected to the binary screen processing are very suitable for high-quality printing in the image output apparatus 2. For example, YMCK binary image data of 4 bits (1 bit×4 colors) can be printed: high-quality printing can be ensured.

In the image reading apparatus 1 according to the embodiment, output characteristics data on the basis of which the image processing will be performed are acquired by uploading from the image output apparatus 2 for printing image data. Therefore, the image processing performed by the image processing unit 16 is made suitable for the output characteristics of the image output apparatus 2 that will print the image data. That is, since the image data are subjected to image processing that is most suitable for the output characteristics of the image output apparatus 2 that will print the image data, high-quality printouts can be obtained reliably. Further, since the output characteristics data are acquired from the image output apparatus 2 by uploading, they need not be prepared in the image reading apparatus 1. As long as the image output apparatus 2 that is connected to the image reading apparatus 1 via the communication channel 3 is configured so as to be able to upload its output characteristics data, high-quality printing can be attained while flexible adaptation is made to any type of image output apparatus 2.

In particular, as described in the embodiment, to attain high-quality printing and increase in productivity due to output load reduction by performing the binary screen processing on image data, it is much preferable that output characteristics data that are acquired by uploading include output gradation correction data on the basis of which the binary screen processing unit 35 of the Post-IPS 30 will perform the binary screen processing.

Further, as described in the embodiment, in the case where image processing to be performed on image data is selected in accordance with output characteristics data acquired by uploading, plural kinds of available image processing need to be prepared in advance in the image reading apparatus 1. With this measure, the image reading apparatus 1 can flexibly accommodate a case that, for example, a plurality of image output apparatus 2 are connected to it via communication channels 3. Systems having sufficient multiplicity of use can thus be constructed.

In the embodiment, various kinds of image processing are performed after conversion into the Lab color space by the Pre-IPS 20. Another configuration is possible in which image processing is performed in the original RGB color space without performing conversion into the Lab color space and then conversion is made into the YMCK color space. Or various kinds of image processing such as the filter processing and the under color removal may be performed after conversion into the YMCK color space.

Although in the embodiment the binary screen processing of 1 bit per color is performed, multi-valued (e.g., four-valued) screen processing of n bits per color may be performed. It is easy to implement a configuration in which image data are compressed and output after being subjected to the screen processing.

Where the image reading apparatus 1 is a copier or a multifunction machine, that is, it has a copying function, various kinds of image processing suitable for printing such as the binary screen processing, under color removal, and gradation correction may be performed by using hardware image processing circuits that are incorporated for realizing the copying function. Using such hardware image processing circuits together makes it possible to high-speed image processing by pipeline processing.

Although in the embodiment output characteristics data on the basis of which the image processing is performed are acquired by uploading from an image output apparatus 2 that will print image data, the invention is not limited to such a case. What is essential is that the image processing be performed on the basis of output characteristics data of an image output apparatus 2 that will print image data. For example, where output characteristics data are stored in the data storage unit 15 in advance, it is not always necessary to acquire those output characteristics data by uploading.

Even where no output characteristics data are stored in the data storage unit 15, output characteristics data may be acquired in the following manner instead of acquisition by uploading. For example, a predetermined test pattern image (pattern shapes etc. are arbitrary) is printed by an image output apparatus 2 whose output characteristics data need to be acquired. A printout is read by the image reading apparatus 1 and a gradation characteristic etc. of the image output apparatus 2 concerned are analyzed on the basis of reading results. As a result, output characteristics data (in particular, output gradation correction data) of the image output apparatus 2 concerned are acquired. In this case, generation of output gradation correction data etc. can be performed by using the computing function of the image reading apparatus 1 and an analysis for the data generation and the data generation itself can be performed by using known techniques. Therefore, the details of the generation of output gradation correction data etc. will not be described. With this measure, even if the image reading apparatus 1 does not have any output characteristics data at the stage of system construction, no problems occur because it can acquire output characteristics data.

Embodiment 2

Figure 4A:
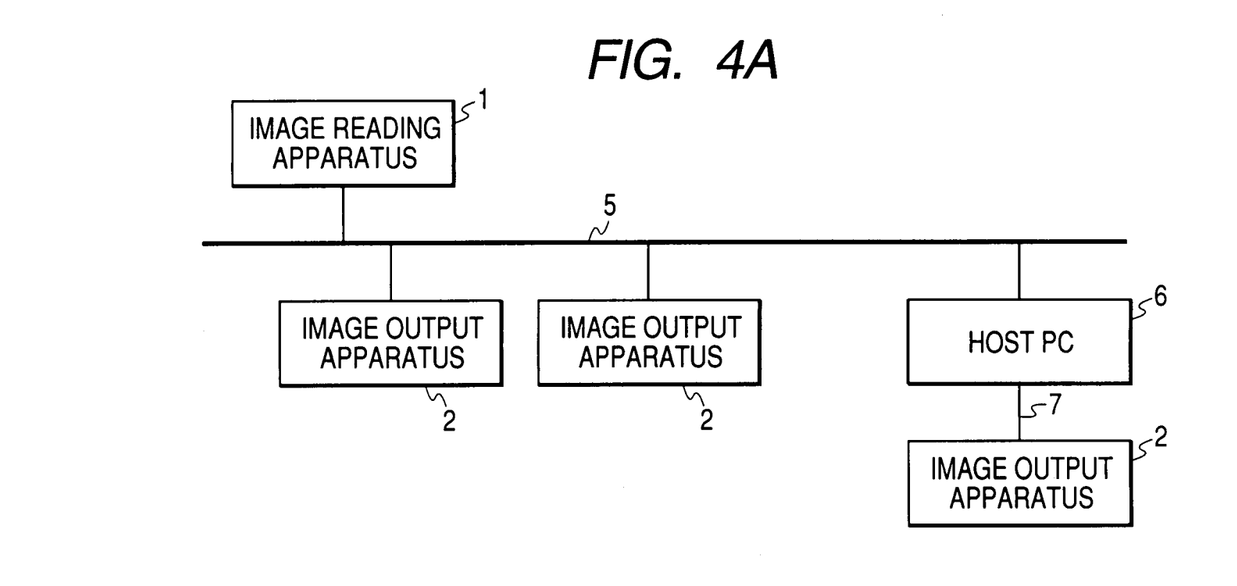
FIGS. 4A and 4B are block diagrams showing system configurations according to a second embodiment of the invention.
Figure 4B:
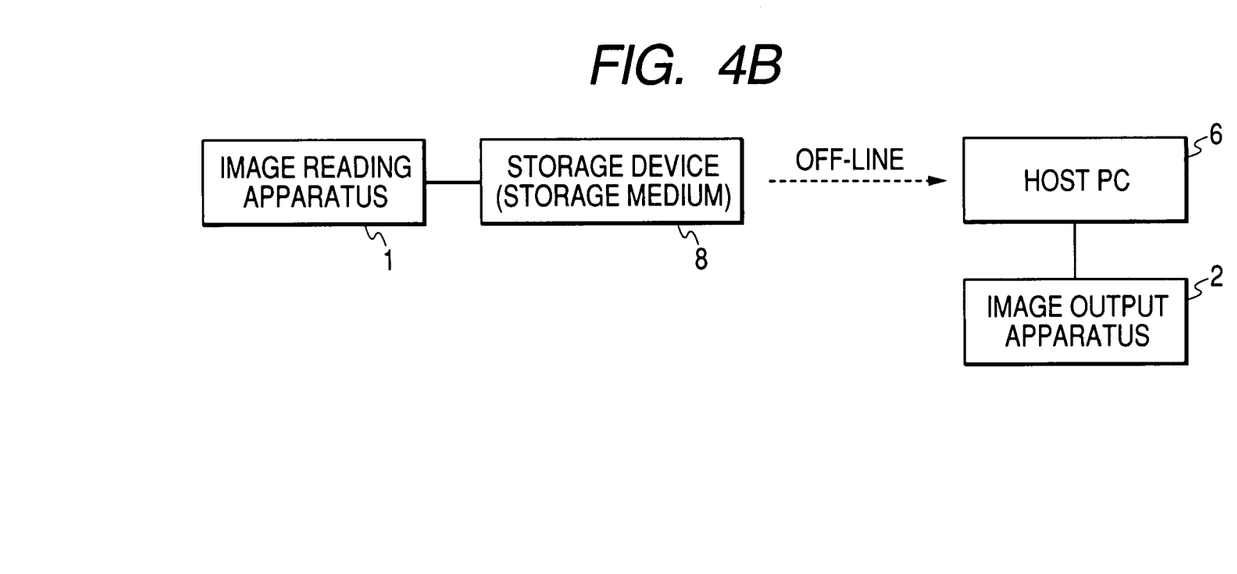

Next, a second embodiment of the invention will be described. Only differences from the first embodiment will be described. FIGS. 4A and 4B are block diagrams showing system configurations according to the second embodiment of the invention.

For example, as shown in FIG. 4A, an image reading apparatus 1 according to this embodiment is used in a system configuration that is different than in the first embodiment. In the first embodiment, the image reading apparatus and the image output apparatus 2 are directly connected to each other according to USB 2.0, for example. However, the invention is not limited to such an image reading apparatus 1. As described in this embodiment, the image reading apparatus 1 may be network-connected. For example, the image reading apparatus 1 may be connected to image output apparatus 2 via a network 5 that enables wired or wireless communications. In this case, it is assumed that not only the image reading apparatus 1 and the image output apparatus 2 but also a host PC 6 is connected to the network 5.

An example of the network 5 is a local area network that enables communications according to TCP/IP (transmission control protocol/Internet protocol). A TCP/IP network enables transfer of an HTML (hypertext markup language) document according to HTTP (hypertext transfer protocol), file transfer according to FTP (file transfer protocol), main transmission according to SMTP (simple mail transfer protocol), designation of a print resource by a client according to IPP (Internet printing protocol), an information search service using the WWW (world wide web) system. However, the network 5 may be to form a wide area network such as the Internet.

The host PC 6 that is connected to the network 5 is, for example, a computer in which software having an image processing function is installed. The host PC 6 is to receive image data from the image reading apparatus 1, perform image processing thereon, and, if necessary, transfer resulting image data to an image output apparatus 2 and cause it to print the image data. Naturally, the host PC 6 may either transfer image data to an image output apparatus 2 connected to the network 5 and cause it to print the image data or supply image data to a local image output apparatus 2 via a communication channel 7 and cause it to print the image data.

Where the image reading apparatus 1 is used in the above system configuration, since a plurality of image output apparatus 2 are connected to the network 5, an operator of the image reading apparatus 1 or the host PC 6 designates an image output apparatus 2 that is to print image data read by the image reading apparatus 1. The image reading apparatus 1 sends image data to the designated image output apparatus 2. Even in this case, as in the case of the first embodiment, the image reading apparatus 1 performs image processing including screen processing on the image data and converts the image-processed image data into PDL-format data and also performs image processing such as the screen processing on the image data on the basis of output characteristics data of the image output apparatus 2 to print the image data. Therefore, this makes it possible to perform high-quality printing without depending on the external functions of the image output apparatus 2 or the host PC 6 as well as to attain high-productivity printing by sending image data directly to the image output apparatus 2 without intervention of the host PC 6.

However, in this embodiment, the operation mode is not limited to the mode that the image reading apparatus 1 sends image data directly to an image output apparatus 2: the image reading apparatus 1 may send image data to the host PC 6. This is because image data may be printed by an image output apparatus 2 that is connected to the host PC via the network or the communication channel 7. That is, the external apparatus that is a destination of image data and is accessed by the image reading apparatus 1 via the external output interface 12 is not limited to an image output apparatus 2 and may be the host PC 6. In the latter case, the host PC 6 can store the received image data temporarily and transfer the image data to an image output apparatus 2 via the network 5 or the communication channel 7 to cause it to print the image data. Further, although the image data are stored in the host PC 6 temporarily, high-quality printing is enabled without depending on the external functions of the image output apparatus 2 or the host PC 6 because the stored image data were subjected to the image processing such as the screen processing based on the output characteristics of the image output apparatus 2 and the conversion into PDL-format data.

As shown in FIG. 4B, the destination of sending of image data from the image reading apparatus 1 may be a storage device 8 connected to the image reading apparatus 1 or a storage medium that is detachable from a storage device 8. The storage device 8 or the storage medium for storing image data can be realized by known technologies; for example, it can be realized by utilizing magnetism or light or using a semiconductor memory or can be a disc-like or card-like storage medium. On the other hand, the storage device 8 or the storage medium should be readable by the host PC 6 to which the image output apparatus 2 is connected. In this case, the image reading apparatus 1 and the host PC 6 need not be connected to each other.

Even where used in the above-configured system, the following operation can be performed. That is, the image reading apparatus 1 sends, to the storage device 8 or the storage medium, image data that have been subjected to the image processing such as the screen processing based on the output characteristics data of an image output apparatus 2 and the conversion into PDL-format data. The image data stored in the storage device 8 or the storage medium are read by the host PC 6 and printed by the image output apparatus 2 that is connected to the host PC 6. Therefore, also in this case, since the image data stored in the storage device 8 or the storage medium have been subjected to the image processing such as the screen processing based on the output characteristics data of the image output apparatus 2 and the conversion into PDL-format data, high-quality printing is enabled without depending on the external functions of the image output apparatus 2 or the host PC 6.

As described above, where the image reading apparatus 1 is used in the system configurations according to this embodiment, not only can image data be sent directly to and printed by an image output apparatus 2 but also sufficient flexibility, multiplicity of use, etc. can be secured in the output form of image data: the convenience to users is enhanced very much.

Embodiment 3

Figure 5A:
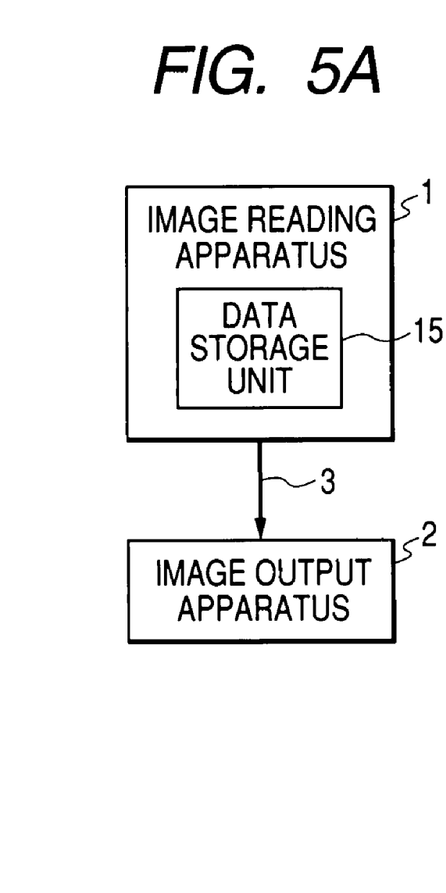
FIGS. 5A and 5B are block diagrams showing a system configuration according to a third embodiment of the invention.
Figure 5B:
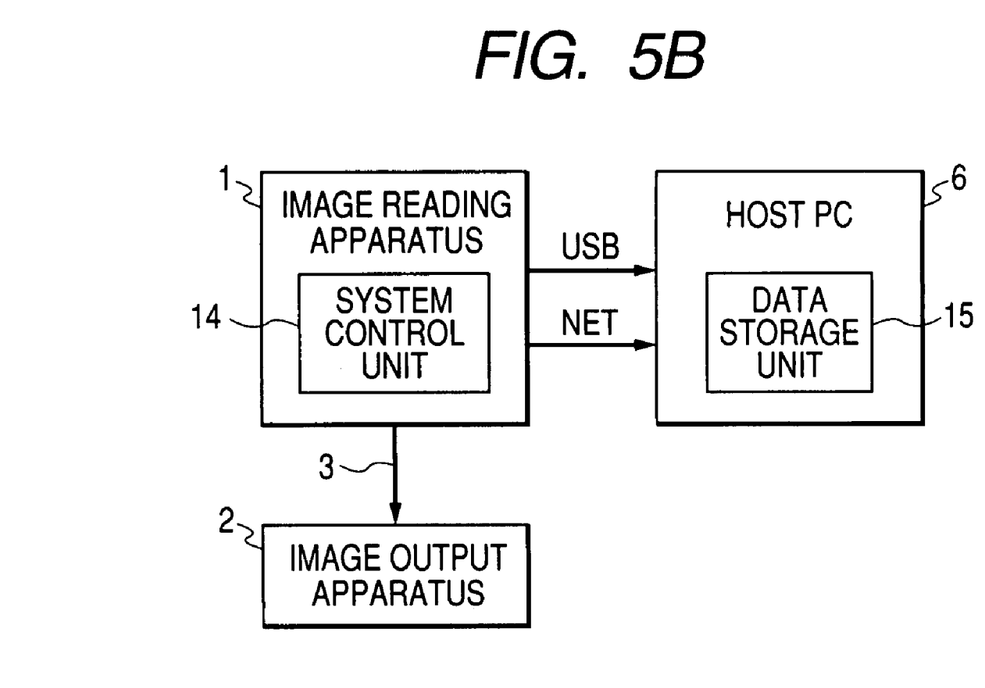

Next, a third embodiment of the invention will be described. Only differences from the first or second embodiment will be described. FIGS. 5A and 5B are block diagrams showing a system configuration according to the third embodiment of the invention.

In the first embodiment, as shown in FIG. 5A, the image reading apparatus 1 incorporates the data storage unit 15 and output characteristics data that are acquired by uploading from the image output apparatus 2 are stored in the data storage unit 15. The storage of the output characteristics data by the data storage unit 15 may be either temporary or permanent.

In contrast, in this embodiment, as shown in FIG. 5B, output characteristics data that are acquired by uploading from the image output apparatus 2 are stored in an external apparatus rather than a unit in the image reading apparatus 1. It is assumed that in addition to the image output apparatus 2 the external apparatus is connected to the image reading apparatus 1 so as to be able to access the image reading apparatus 1 via the external output interface unit 12. A typical example of the external apparatus is a host PC 6. However, the external apparatus is not limited to the host PC 6 as long as it has the function of the data storage unit 15 for storing output characteristics data. As described in the second embodiment, the image reading apparatus 1 and the host PC 6 (external apparatus) may be connected to each other either directly according to USB or the like or via a network.

It is assumed that in the image reading apparatus 1 the system control unit 14 has a function of a data managing unit for storing output characteristics data in the external apparatus that is connected to the image reading apparatus 1 so as to be able to access the image reading apparatus 1 via the external output interface unit 12. That is, when output characteristics data are uploaded from the image output apparatus 2, the system control unit 14 transfers the output characteristics data to the host PC 6 and causes those data to be stored in a prescribed area of the data storage unit 15 of the host PC 6. When the Post-IPS 30 performs the image processing, the system control unit 14 accesses the host PC 6 and causes necessary output characteristics data to be downloaded from the host PC 6.

Even where used in the above-configured system, the image reading apparatus 1 sends, to the image output apparatus 2, image data that have been subjected to the image processing such as the screen processing based on the output characteristics data of the image output apparatus 2 and the conversion into PDL-format data. Therefore, high-quality printing is enabled without depending on the external functions of the image output apparatus 2 or the host PC 6.

Where the image reading apparatus 1 is used in the system configuration according to this embodiment, a sufficient storage capacity can be secured by using the external apparatus even if a sufficient storage capacity can not be secured in the image reading apparatus. That is, the flexibility, the multiplicity of use, etc. of the system configuration can be enhanced by effectively utilizing the resources in the system: the convenience to users is enhanced very much.

The entire disclosure of Japanese Patent Application No. 2004-68539 filed on Mar. 11, 2004 including specification, claims, drawings and abstract is incorporated herein by reference in its entirety.

What is claimed is:

1. An image reading apparatus comprising:
   an image input unit for obtaining multi-valued image data by reading an image optically;
   an image processing unit for performing image processing including screen processing on the multi-valued image data obtained by the image input unit;
   a data converting unit for converting image data obtained by the image processing of the image processing unit into a form that is described in a page description language; and
   an image output unit for outputting image data obtained by the conversion of the data converting unit to the outside.

2. The image reading apparatus according to claim 1, wherein
   the image output unit sends the image data obtained by the conversion of the data converting unit to an external apparatus that is connected to the image reading apparatus via an external interface.

3. The image reading apparatus according to claim 1, wherein
   the image output unit sends the image data obtained by the conversion of the data converting unit to a storage device or a detachable storage medium.

4. The image reading apparatus according to according to claim 1, wherein
   the image processing unit performs the screen processing after the multi-valued image data obtained by the image input unit are converted by a color converting unit into image data of primary colors of an image output apparatus.

5. The image reading apparatus according to claim 4, wherein
   the color converting unit converts the multi-valued image data obtained by the image input unit into image data in a YMCK or YMC color space.

6. An image reading apparatus comprising:
   an image input unit for obtaining multi-valued image data by reading an image optically;
   an image processing unit for performing image processing including screen processing on the multi-valued image data obtained by the image input unit; and
   an image output unit for outputting image data obtained by the image conversion of the image processing unit to the outside, wherein:
   the image processing unit performs the image processing on the basis of output characteristics data of an image output apparatus that is to print the image data that are output by the image output unit.

7. The image reading apparatus according to claim 6, comprising
   a data acquiring unit for acquiring the output characteristics data from the image output apparatus that is to print the image data that are output by the image output unit.

8. The image reading apparatus according to claim 6, wherein
   the image processing unit selects a method of image processing to be performed on the multi-valued image data obtained by the image input unit.

9. The image reading apparatus according to claim 6, further comprising
   a data storing unit for storing the output characteristics data.

10. The image reading apparatus according to claim 6, further comprising
   a data managing unit for storing the output characteristics data in an external apparatus that is connected to the image reading apparatus via an external interface.

11. An image reading apparatus comprising:
   an image input unit for obtaining multi-valued image data by reading an image optically;
   an image processing unit for performing image processing including screen processing on the multi-valued image data obtained by the image input unit;
   a data converting unit for converting image data obtained by the image processing of the image processing unit into a form that is described in a page description language;
   a image output unit for outputting image data obtained by the conversion of the data converting unit to the outside; and
   a data acquiring unit for acquiring output characteristics data on the bases of which the image processing unit performs the image processing from an image output apparatus that is to print the image data that are output by the image output unit.

\* \* \* \* \*